United States Patent [19]

Matsuhashi et al.

[11] Patent Number: 4,984,281

[45] Date of Patent: Jan. 8, 1991

[54] MAGNETIC INK CHARACTER RECOGNITION SYSTEM

[75] Inventors: Tomohiro Matsuhashi, Tachikawa; Hideo Kamata, Kawasaki; Masami Yasuda, Chofu; Satoshi Kataoka, Fuchu; Hideyuki Inaoka, Tama; Eiichi Watanabe, Kawasaki, all of Japan

[73] Assignee: Fujitsu Limited, Kanagawa, Japan

[21] Appl. No.: 493,608

[22] Filed: Mar. 15, 1990

[30] Foreign Application Priority Data

Mar. 16, 1989 [JP] Japan .................................... 1-62266

[51] Int. Cl.$^5$ .............................................. G06K 9/18
[52] U.S. Cl. .......................................... 382/7; 382/55; 382/64; 235/449
[58] Field of Search ............... 382/7, 64, 55; 235/437, 235/449

[56] References Cited

U.S. PATENT DOCUMENTS

| | | | |
|---|---|---|---|
| 3,528,058 | 9/1970 | Bond | 382/7 |
| 3,668,637 | 6/1972 | Sakai et al. | 382/55 |
| 3,668,638 | 6/1972 | Iijima et al. | 382/55 |
| 4,148,010 | 4/1979 | Shiau | 382/7 |

*Primary Examiner*—Leo H. Boudreau
*Assistant Examiner*—Barry Stellrecht
*Attorney, Agent, or Firm*—Armstrong, Nikaido, Marmelstein, Kubovcik & Murray

[57] ABSTRACT

In a magnetic ink character recognition system provided in a magnetic ink character reader, the system includes; a read unit for detecting magnetic flux generated from each magnetic ink character separately printed in every field in a check or bill, and outputting a digital signal read therefrom; a storage unit operatively connected to the read unit for storing the digital signals output from the read unit; a field sort unit operatively connected to the storage unit for receiving the digital signals from the storage unit in every field and sorting the digital read signals for each field; a decision unit operatively connected to the field sort unit for receiving the digital read signal sorted by the field sort unit, judging the thickness of the magnetic ink character in every field, and determining a representative thickness value in every field; a correction unit operatively connected to the storage unit and the decision unit for receiving the digital signals from the storage unit and correcting the digital signals based on decision data output from the decision unit for every field; and a recognition unit operatively connected to the correction unit for determining whether or not the corrected signals are readable.

3 Claims, 12 Drawing Sheets

Fig. 2A
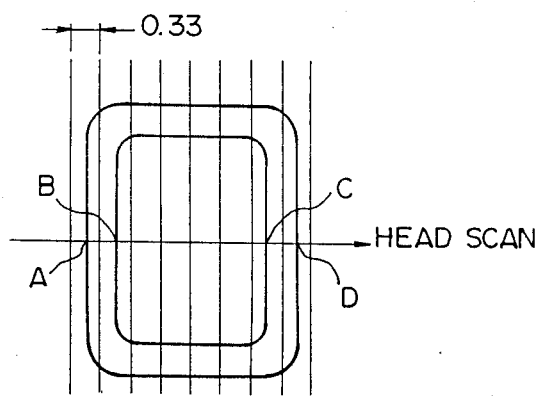
Fig. 2B
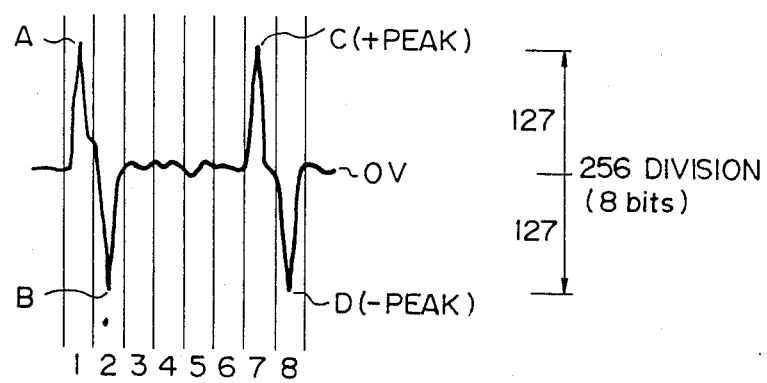
Fig. 2C
| 1 | 0 | 0 | 0 | 0 | 0 | 1 | 0 |
|---|---|---|---|---|---|---|---|
| 0 | 1 | 0 | 0 | 0 | 0 | 0 | 1 |
1: PEAK POSITION

Fig. 3

FIXED CODE

| STROKE NO. | +PEAK POSITION | | | | | | | | +CODE | −PEAK POSITION | | | | | | | | −CODE |
|---|---|---|---|---|---|---|---|---|---|---|---|---|---|---|---|---|---|---|
| | 1 | 2 | 3 | 4 | 5 | 6 | 7 | 8 | | 1 | 2 | 3 | 4 | 5 | 6 | 7 | 8 | |
| 0 | 1 | 0 | 0 | 0 | 0 | 0 | 1 | 0 | 82 | 0 | 1 | 0 | 0 | 0 | 0 | 0 | 1 | 41 |
| 1 | 1 | 0 | 1 | 0 | 0 | − | − | − | A0 | 0 | 0 | 0 | 1 | 1 | − | − | − | 18 |
| 2 | 1 | 0 | 0 | 1 | 0 | − | − | − | 90 | 0 | 1 | 0 | 0 | 1 | − | − | − | 48 |
| 3 | 1 | 1 | 0 | 0 | 0 | 0 | − | − | C0 | 0 | 0 | 1 | 0 | 0 | 1 | − | − | 24 |
| 4 | 1 | 0 | 0 | 0 | 1 | 0 | 0 | − | 88 | 0 | 0 | 1 | 0 | 0 | 0 | 1 | − | 22 |
| 5 | 1 | 0 | 0 | 0 | 1 | 0 | − | − | 88 | 0 | 1 | 0 | 0 | 0 | 1 | − | − | 44 |
| 6 | 1 | 0 | 1 | 0 | 0 | 1 | 0 | − | A4 | 0 | 1 | 0 | 1 | 0 | 0 | 1 | − | 52 |
| 7 | 1 | 0 | 1 | 0 | 1 | 0 | − | − | A8 | 0 | 1 | 0 | 1 | 0 | 1 | − | − | 54 |
| 8 | 1 | 1 | 0 | 0 | 0 | 1 | 0 | 0 | C4 | 0 | 0 | 1 | 0 | 0 | 0 | 1 | 1 | 23 |
| 9 | 1 | 0 | 0 | 0 | 0 | 1 | 0 | − | 84 | 0 | 1 | 1 | 0 | 0 | 0 | 1 | − | 62 |
| 10 | 1 | 0 | 0 | 0 | 0 | 1 | 0 | 0 | 84 | 0 | 0 | 0 | 1 | 0 | 0 | 0 | 1 | 11 |
| 11 | 1 | 0 | 0 | 1 | 0 | 1 | 0 | 0 | 94 | 0 | 0 | 1 | 0 | 1 | 0 | 0 | 1 | 29 |
| 12 | 1 | 0 | 0 | 0 | 1 | 0 | 1 | 0 | 8A | 0 | 0 | 0 | 1 | 0 | 1 | 0 | 1 | 15 |
| 13 | 1 | 0 | 1 | 0 | 0 | 1 | 0 | 0 | A4 | 0 | 1 | 0 | 0 | 1 | 0 | 0 | 1 | 49 |

Fig. 5

CHECK FORM (MICR)

- ① AMOUNT OF MONEY
- ② COLUMN FOR ISSUING BANK — BANK BRANCH CHECK ACCOUNT NUMBER NUMBER NUMBER
- ③ BANK CODE
- ④ ADDITIONAL COLUMN FOR EXCHANGER — EXCHANGE NUMBER / ADDITIONAL COLUMN FOR ISSUING BANK I
- ⑤ ADDITIONAL COLUMN FOR ISSUING BANC II

MAGNETIC INK CHARACTER RECOGNITION SYSTEM

BACKGROUND OF THE INVENTION

1. Field of the Invention

The present invention relates to a magnetic ink character recognition system provided in a magnetic ink character reader.

2. Description of the Related Art

Magnetic ink character readers (below, MICR) are mainly utilized in banks for reading and sorting checks or bills on which magnetic ink characters are printed. A magnetic ink character is a character printed using ink which includes a magnetic powder material.

As is well known, a check or bill returns to the bank after passing through various circulation routes. Accordingly, it is usually damaged in the circulation route. Therefore, it is necessary to print the characters on the check or bill using magnetic ink to ensure reliable reading of the character.

In general, there are two types of magnetic ink characters, i.e., E13B and CMC 7, which are standardized by the International Standard Organization (ISO). The former is currently used throughout the world, particularly in Japan and the U.S., and comprises ten numerals (0 to 9) and four symbols, as explained hereinafter.

SUMMARY OF THE INVENTION

The object of the present invention is to provide a magnetic ink character recognition system enabling highly reliable recognition of the magnetic ink characters printed on a check or bill.

In accordance with the present invention, there is provided a magnetic ink character recognition system including; a read unit for detecting magnetic flux generated from each magnetic ink character separately printed in every field in a check or bill, and outputting a digital signal read therefrom; a storage unit operatively connected to the read unit for storing the digital signals output from the read unit; a field sort unit operatively connected to the storage unit for receiving the digital signals from the storage unit for every field and sorting the digital signals from each field; a decision unit operatively connected to the field sort unit for receiving the digital signals sorted by the field sort unit, judging the thickness of the magnetic ink character in every field, and determining a representative thickness value for every field; a correction unit operatively connected to the storage unit and the decision unit for receiving the digital signals from the storage unit and correcting the digital signals based on decision data output from the decision unit for every field; and a recognition unit operatively connected to the correction unit and for determining whether or not the corrected signals are readable.

BRIEF DESCRIPTION OF THE DRAWINGS

In the drawings:

FIGS. 2A and 2B are views for explaining the relationship between a numeral and a waveform;

FIG. 2C is a view for explaining a binary coded character to indicate peak positions of the numeral;

FIG. 3 is a view for explaining the binary codes of all the characters to indicate peak positions in the standard waveforms;

FIG. 5 is a view for explaining positions for printing magnetic ink characters on a check form;

DESCRIPTION OF THE PREFERRED EMBODIMENTS

Before describing the preferred embodiments, an explanation will be given of the conventional art.

Figure 1:
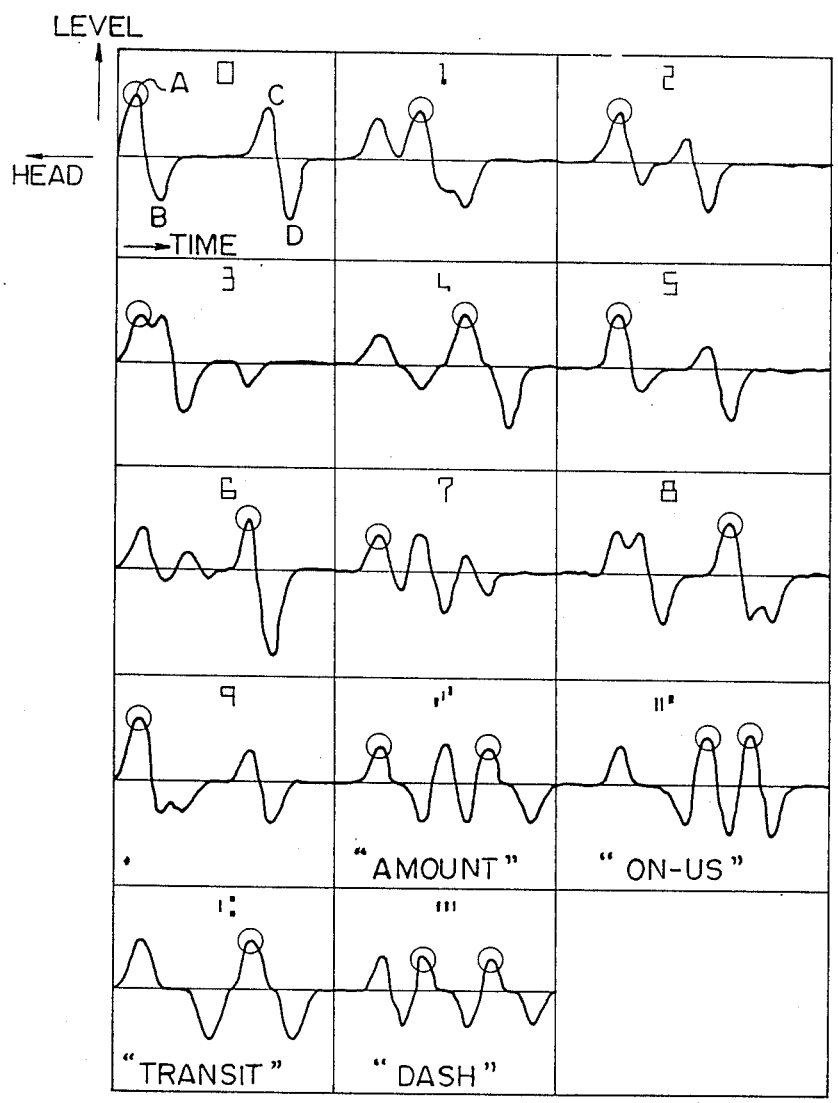
FIG. 1 shows output waveforms of magnetic ink characters based on the E13B pattern.

FIG. 1 shows output waveforms of magnetic ink characters based on the E13B pattern. The magnetic ink character is previously magnetized and the magnetized character is read out by a magnetic head of the MICR. That is, when the check or bill having the magnetic ink character moves across the magnetic head as shown by the arrow line, the magnetic head detects the magnetic flux of the magnetic ink character along with the elapse of time and outputs the characteristic curve in accordance with the change of the density of the magnetic flux.

As shown in FIG. 1, the E13B pattern is constituted by ten numerals and four symbols. Each character and symbol are shown by a particular pattern having a different characteristic curve. In this case, the four symbols represent "Amount", "On-Us", "Dash" and "Transit", respectively.

FIGS. 2A and 2B are views for explaining the relationship between a numeral and a waveform (i.e., characteristic curve). In FIG. 2A, a numeral, for example, "0" is divided into eight sections, each having the width 0.33 mm. In this case, the width 0.33 mm corresponds to the standard line width (thickness) of the character.

As shown in FIG. 2B, when the magnetic head scans the numeral "0" from the left to the right as shown by the arrow line, the first positive peak A is obtained from the edge A of the numeral "0", the first negative peak B is obtained from the edge B, the second positive peak C is obtained from the edge C, and the second negative peak D is obtained from the edge D.

FIG. 2C is a view for explaining a binary coded character to indicate peak positions of the numeral. In FIG. 2C, the code "1" corresponds to the positive and negative peak positions A and B of the waveform shown in FIG. 2B.

FIG. 3 is a view for explaining the binary codes of all the characters to indicate peak positions in the standard waveforms. These binary codes are the fixed codes stored in a read only memory (ROM) 821 shown in FIG. 9 as explained below. The stroke number corresponds to each numeral and symbol. In this case, the stroke 10 corresponds to "Transit", the stroke 11 to "Amount", the stroke 12 to "On-Us" and the stroke 13 to "Dash". Further, "+code" and "−code" indicate corresponding hexadecimal numbers.

Figures 4A, 4B, 4C:
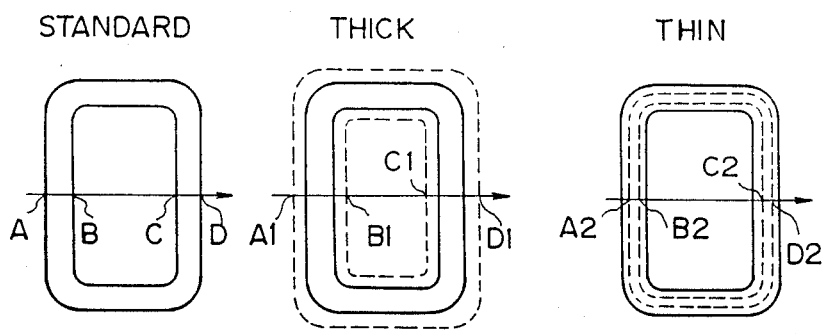
FIGS. 4A to 4D are views for explaining the relationship between the thickness and the peak position.
Figure 4D:
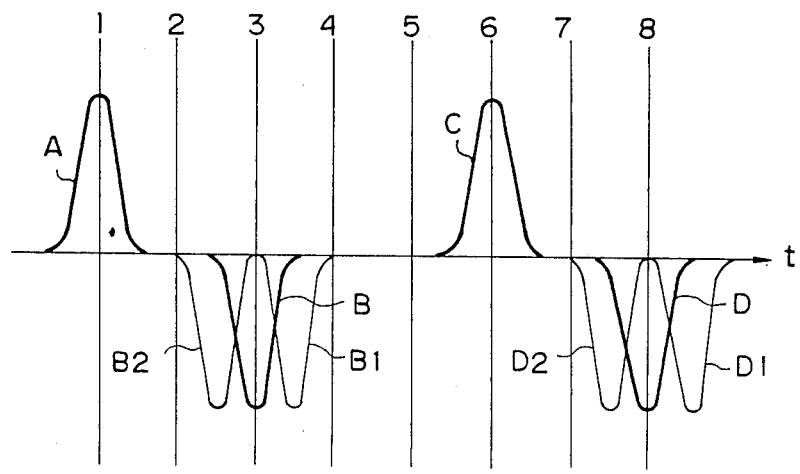

FIGS. 4A to 4D are views for explaining the relationship between the thickness and the peak position. The line width shown in FIG. 4A is in the case of the standard line width, FIG. 4B shows a thick line compared with the standard line, and FIG. 4C shows a thin line compared with the standard line. In FIG. 4B, when aligning the edge A1 of the thick line with the edge A of the standard line, the peak position of the edge B1 is shifted as shown by the negative peak position B1 in FIG. 4D. That is, the peak position B1 is located after the standard negative peak position B. Further, in FIG. 4C, when aligning the edge A2 of the thin line with the edge A of the standard line, the peak position of the edge B2 is shifted as shown by the negative peak position B2 in FIG. 4D. That is, the peak position B2 is located before the standard negative peak position B.

In case of the edges C and D, the peak positions are shifted as shown by the peaks D1 and D2, in the same way as explained above.

In this case, however, when the degree of shift of the negative peak position is too large, the waveform approximates another character so that the MICR can misread that pattern as same other character. For example, the waveform of the character "0" is close to that of the character "9" as shown in FIG. 1 so that the MICR may judge the character "0" to be the character "9".

FIG. 5 is a view for explaining positions for printing magnetic ink characters on a check form 50 (MICR form). The position of the print of the magnetic ink character is divided into five "fields" 1 to 5. The first field 1 is used for writing an amount of money. The second field 2 is used by a bank issuing the check. At the bank, data regarding the bank, for example, a branch number, a check number, and an account number are written in this field.

The third field 3 is used by a place exchanging the check (clearing house), and the exchange number and bank code are written in this field. The field 4 is used in the bank to write additional data. The field 5 is also used in the bank to write other additional data.

Additionally, a one-character space P is provided between each of the fields 1 to 5.

The magnetic ink characters in each field are printed by a magnetic ink character encoder provided in the corresponding bank or the place of exchange in the circulation route. For example, the field 1 indicating the amount of the money is printed by the bank which receives the check, and the field 2 is printed by the bank which issues the check.

Figure 6:
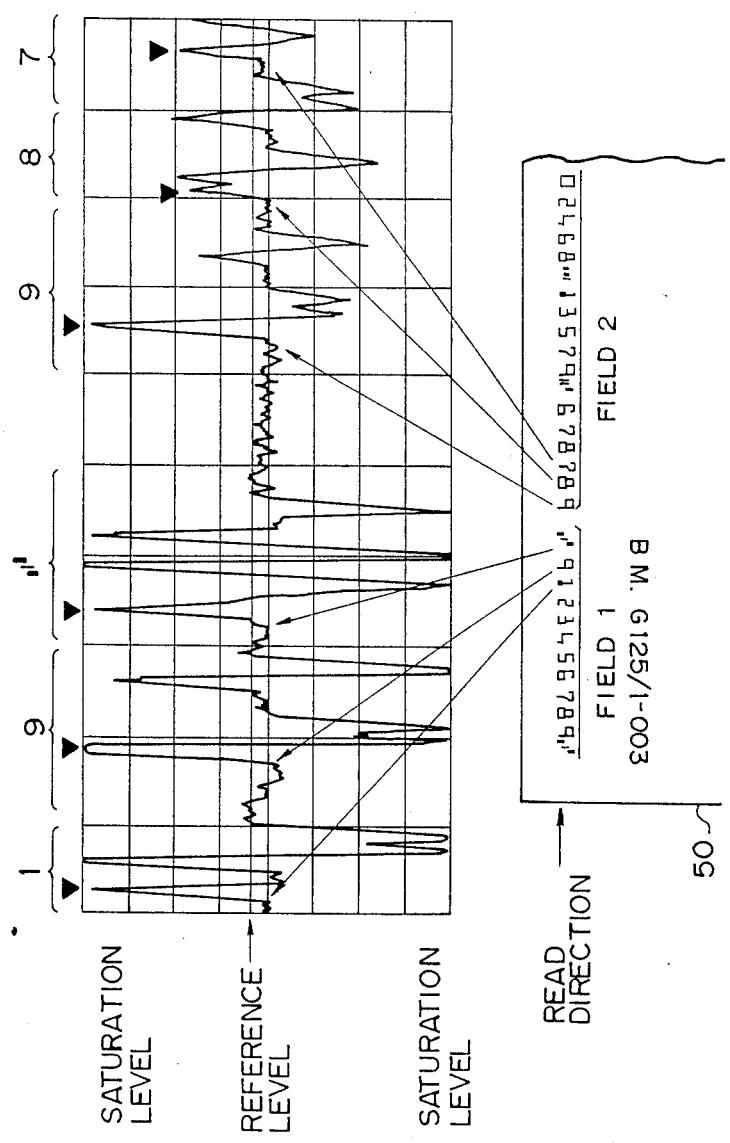
FIG. 6 is a view for explaining differences between waveforms of each of characters as read out from the check.

FIG. 6 is a view for explaining the differences between the waveforms of each character read out from the check. In general, the size, the line width, and the position of the print of the magnetic ink character are already standardized by the ISO.

There is some dispersion of the characteristics among the magnetic ink character encoders provided at the various places, caused by a mechanical structure using an impact head. That is, since characters having a magnetic flux can be obtained by striking a magnetic ink sheet using the impact head, the dispersion occurs in accordance with the force of the impact head. Accordingly, in FIG. 6, the difference in the peak level between the field 1 and the field 2 is caused by the dispersion of the line width of each character.

Figure 7:
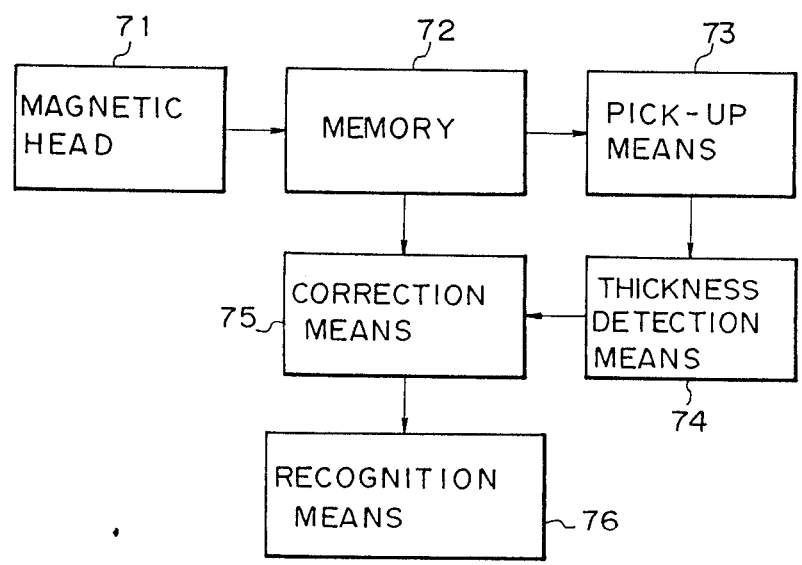
FIG. 7 is a block diagram of a conventional magnetic ink character recognition system.

FIG. 7 is a block diagram of a conventional magnetic ink character recognition system. In FIG. 7, reference number 71 denotes a magnetic head for reading the magnetic ink character, 72 denotes a memory for storing the signal read out from the magnetic head, 73 denotes a means for picking up one character from the signal, 74 denotes a detection means for detecting the line width of the character, 75 denotes a correction means for correcting the signal based on the resultant thickness data of the line from the detection means, and 76 denotes a recognition means for recognizing the signal corrected by the correction means.

In the conventional method, the judgment of the thickness of the character is performed for every character regardless of the fields 1 to 5. As explained above, the dispersion of the size and the thickness of the characters is caused by the difference between the encoders provided at various places. In this case, information in every field, i.e., information in every encoder, is very poor so that it is impossible to precisely recognize and judge the thickness of each character.

The magnetic ink character recognition system according to the present invention will be explained in detail hereinafter.

Figure 8:
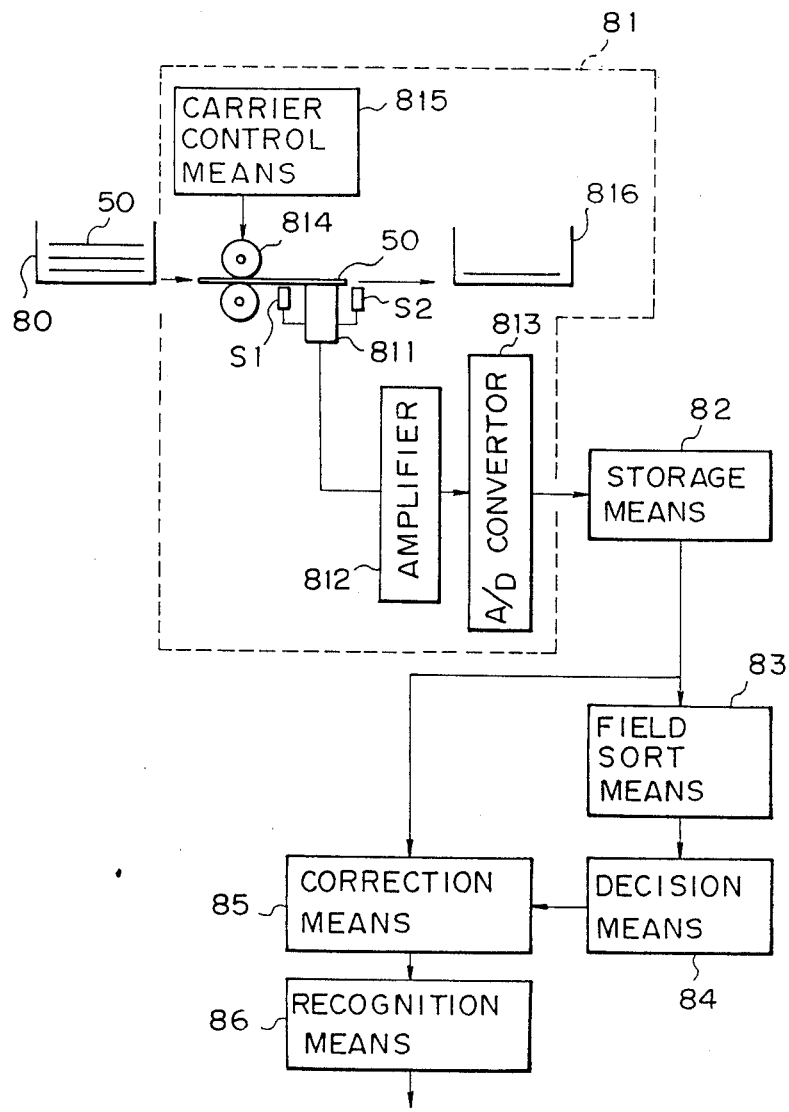
FIG. 8 is a schematic block diagram of a magnetic ink character recognition system according to the present invention.

FIG. 8 is a schematic block diagram of a magnetic ink character recognition system according to the present invention. In FIG. 8, the magnetic ink character recognition system according to the present invention is basically constituted by a read means 81, a storage means 82, a field sort means 83, a decision means 84, a correction means 85, and a recognition means 86. Reference number 80 denotes a hopper for storing an unprocessed check form 50.

The read means 81 further comprises a magnetic read head 811 for reading the magnetic ink character, an amplifier 812 for amplifying a signal read by the head 811, an analog-to-digital converter (A/D converter) 813, a roller carrier 814 for carrying the check form 50 using a DC motor, a carrier control means 815 for controlling the DC motor to rotate the roller carrier 814, and a stacker 816 for stacking the check form 50.

Further, the magnetic read head 811 has sensors S1 and S2. The sensor S1 is provided on the left side (upper stream), and the sensor S2 is provided on the right side (down stream) of the magnetic read head 811. When the check form 50 passes through the sensor S1, the magnetic head 811 starts to read the characters printed on the check form 50. The magnetic head 811 reads the check 50 until the end of the check 50 passes through the sensor S2. After the end of the check 50 passes through the sensor S2, the data sampled between the time of the end of the check 50 passed from the magnetic head 811 to the sensor S2 is deleted. The sorting of the fields is performed based on a previously registered distance data for every field as explained below.

The storage means 82 (below, memory) stores the digital data read out by the magnetic head 811. In this case, the output waveform read out by the magnetic head 811 as shown in FIG. 2C is divided into 256 sections (8 bits) by the A/D converter 813. The divided data are stored in the memory 82 in accordance with a sampling time of one character divided into 64 sections. Accordingly, the character data is stored in the memory in the form shown in FIG. 3.

The field sort means 83 reads the character data from the memory 82 every one character, and sorts the fields in accordance with the number of characters, the position of the characters, and the space between the fields.

The decision means 84 judges the thickness of the character from the peak position at every one character and determines the representative thickness value from the mean value of the thickness at one field.

The correction means 85 corrects the read signal stored in the memory 82 from the decision data of the decision means 84 based on the procedure explained in detail hereinafter.

The recognition means 86 recognizes the magnetic ink character based on the data corrected by the correction means 85 by comparing the corrected data with the fixed data shown in FIG. 3. That is, all positive and negative peak positions are detected from each waveform and are given a "+code" and "−code". The "+code" and "−code" are compared with the fixed codes shown in FIG. 3 in the recognition means 86. Accordingly, the recognition of the character is performed by comparing the corrected data with the fixed data in the recognition means 86.

As previously explained, since the magnetic ink characters in the same field are printed by the same encoder, the dispersion of the thickness of the characters is also the same in one field. Accordingly, in the present invention, the decision means 84 judges the thickness of all characters contained in one field and obtains a representative thickness from the mean value of all thickness data in one field.

Further, the correction means 85 corrects the read signal from the memory 82 for every field based on the decision data from the decision means 84, and the recognition means 86 recognizes whether the corrected data is readable or not.

Accordingly, in the present invention, the correction of the character is performed by utilizing all information of the magnetic ink characters contained in every field so that it is possible to derive the suitable correction value.

Figure 9:
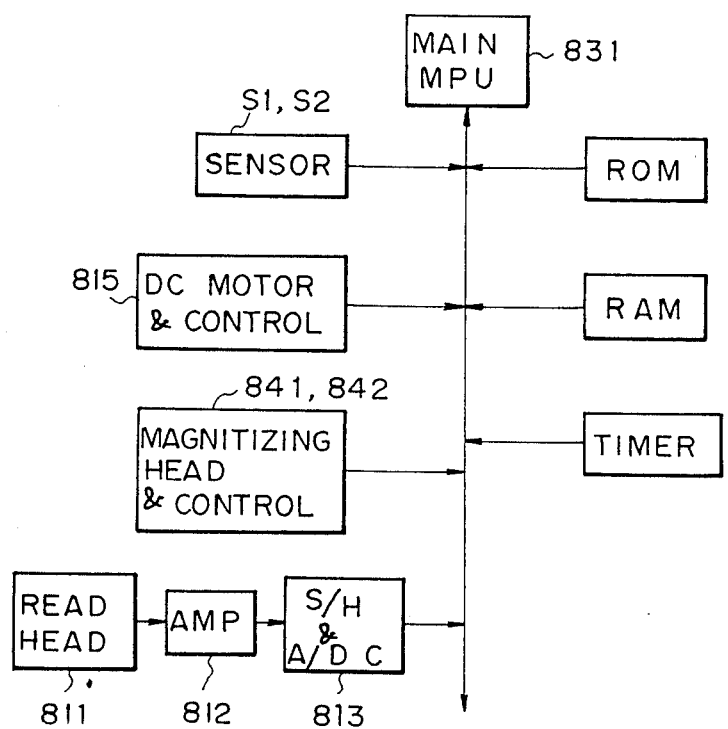
FIG. 9 is a schematic block diagram of a magnetic ink character recognition system according to an embodiment of the present invention.

FIG. 9 is a schematic block diagram of the magnetic ink character recognition system according to an embodiment of the present invention. This system is basically controlled by a microprocessor based on the flowchart shown in FIG. 10. In FIG. 9, the same reference numbers as that of FIG. 8 are attached to the same components.

Reference number 821 denotes a read only memory (ROM) for storing the fixed codes shown in FIG. 3. Reference number 822 denotes a random access memory (RAM) for storing the sampling data.

Figure 10A:
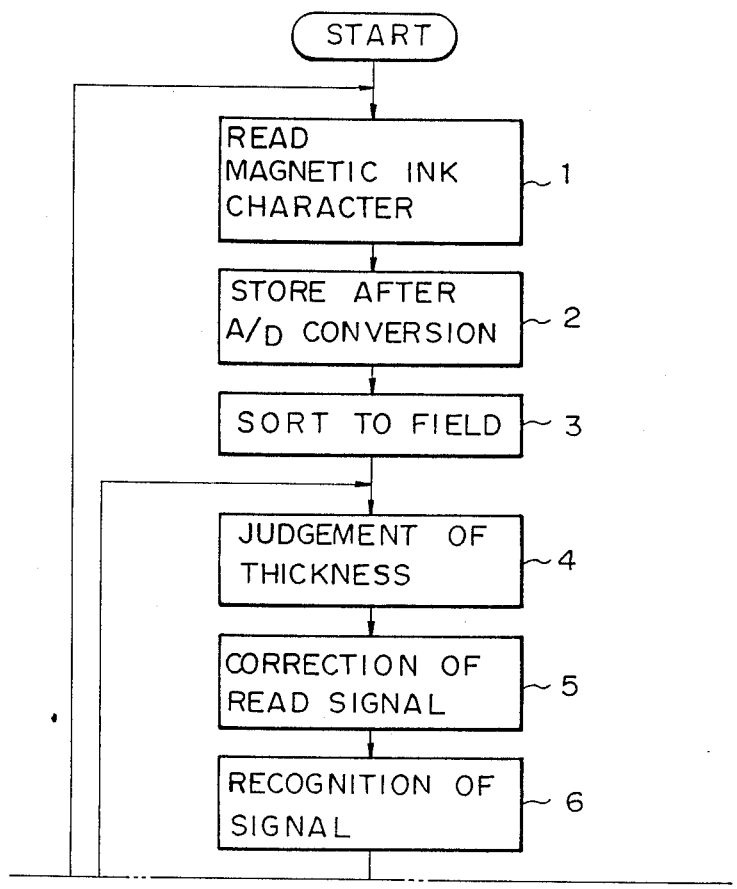
FIG. 10, consisting of FIGS. 10A and 10B, is a basic flow chart showing operation of a character recognition system according to the present invention.
Figure 10:
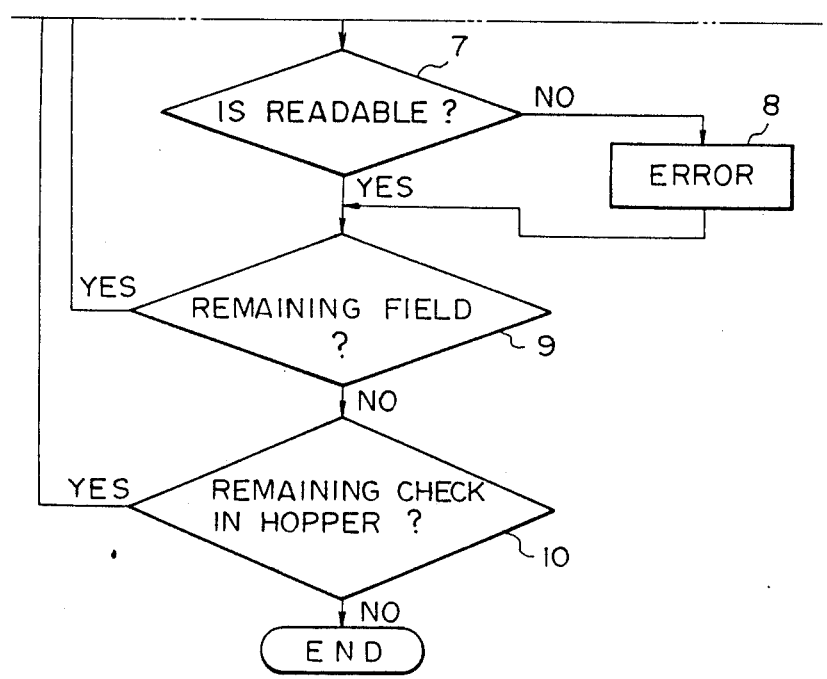

Reference number 831 denotes a main microprocessor for controlling this system based on a predetermined program shown in FIG. 10. That is, the microprocessor 831 performs the sort, the decision, the correction and the recognition based on the data in the ROM 821 and the RAM 822 in accordance with the procedure shown in FIG. 10.

Reference number 832 denotes a timer which starts timing when the sensor S1 detects a check. The timer stops when the digital data is stored in the RAM 822.

The A/D converter 813 has a sample/hold means for sampling a character divided into 64 sections. A magnetizing head 841 and a control means 842 are also provided for magnetizing the character having the magnetic powder material in the previous step. However, an explanation of these components 841 and 842 is omitted because these components are not directly related to the present invention.

FIG. 10 is a basic flow chart showing operation of a character recognition system according to the present invention. In FIG. 10, the magnetic head 811 reads the magnetic ink character (step 1), and the data read out from the magnetic head 811 is stored in the memory 82 after the amplification and A/D conversion (step 2).

The field sort means 83 picks up the data contained in one character from the memory 82 and sorts each field in accordance with the number of characters, the position of the character, and the space between the fields (step 3). After this step, each field 1 to 5 can be separately processed by a microprocessor.

The decision means 84 judges the thickness of the magnetic ink character printed on the check in every field based on the amount of shift of the peak position compared with the standard width (step 4). In this case, the decision of the thickness is performed for all characters in one field and a representative thickness is decided from the mean value of all data in one field.

The correction means 85 corrects the negative peak position of the waveform based on the thickness data output from the decision means 84 as explained in detail hereinafter (step 5).

The recognition means 86 recognizes the corrected data and outputs the corrected signal as a readable signal (step 6). When the recognition means 86 cannot recognize the corrected data, the read data is processed as an error (steps 7 and 8). In the present invention, the above steps 1 to 9 are performed for all fields 1 to 5 of one check (step 9). When no checks 50 remain in the hopper 80 (step 10), the recognition is completed.

Figure 11:
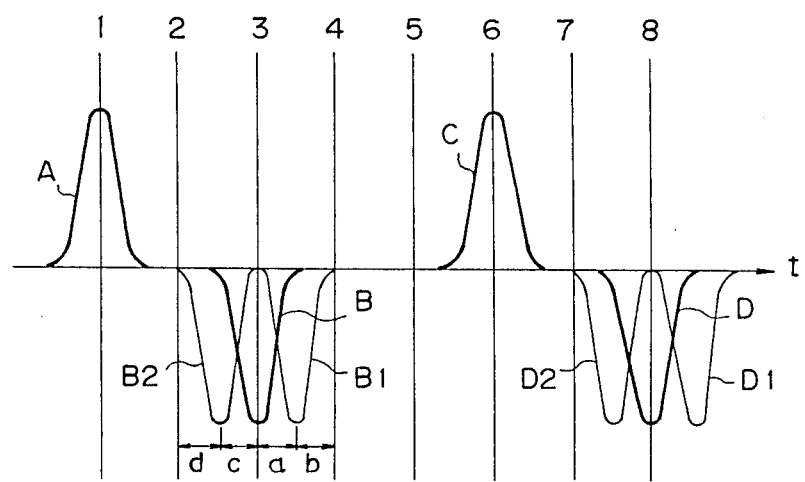
FIG. 11 is a view for explaining the correction at the correction means in FIG. 8.

FIG. 11 is a view for explaining the correction at the correction means 85 in FIG. 8. In FIG. 11, as explained in FIGS. 4A to 4D, when aligning the edge A1 (see, FIG. 4B) with the edge A of the standard line (see, FIG. 4A), the peak position of the edge B1 is shifted as shown by the negative peak position B1. That is, the peak position B1 is located after the standard negative peak position B. Further, when aligning the edge A2 (see, FIG. 4C) with the edge A of the standard line, the peak position of the edge B2 is shifted as shown by the negative peak position B2. That is, the peak position B2 is located before the standard negative peak position B. In case of the edges C and D, the peak positions are shifted as shown by the peaks D1 and D2, in the same way as explained above.

As previously explained, the distance between each of lines 1 to 8 is set to 0.33 mm as the standard width (standard thickness). As is obvious from the drawing, in the standard thickness of the character, the peak position A is located on the line A and the peak position B is located on the line 3.

In this case, one half the distance between the line 3 and the line 4 (i.e., half of the standard thickness) is indicated by "a " and "b", and half of the distance between the line 2 and the line 3 is indicated by "c " and "d".

In the present invention, the position of the peak of the curve B1 or curve B2 is compared with a half was point of the distance and a shifted value is corrected in the correction means 85. That is, when the half way value "b " exceeds the half way value "a " (i.e., a<b), the curve B1 is corrected to the curve B in the correction means 85. Further, when the half way value "d " exceeds the half way value "c " (i.e., d>c), the curve B2 is corrected to the curve B. Accordingly, the curve B1 is corrected to the left side when the above condition (a<b) is satisfied, and the curve B2 is corrected to the right side when the above condition (d>c) is satisfied.

In this case, as explained above, when "a" is equal to "b", the peak position of the curve B1 is located at half the distance between line 3 and 4. When "c" is equal to "d", the peak position of the curve B2 is located at half the distance between line 2 and 3. However, such conditions can be negligible in the correction procedure because these cases are very rare in the correction process.

We claim:

1. A magnetic ink character recognition system provided in a magnetic ink character reader, comprising;
   a read means (81) for detecting magnetic flux generated from each magnetic ink character separately printed at every field in a check or bill and outputting a digital signal read therefrom;
   a storage means (82) operatively connected to said read means (81) for storing the digital signals output from said read means (81);
   a field sort means (83) operatively connected to said storage means (82) for receiving the digital signals from said storage means (82) at every field and sorting the digital signals for each field;
   a decision means (84) operatively connected to said field sort means (83) for receiving the digital signals sorted by said field sort means (83), judging thickness of the magnetic ink characters in every field, and determining a representative thickness value at every field;
   a correction means (85) operatively connected to said storage means (82) and said decision means (84) for receiving the digital signals from said storage means (82) and correcting the digital signals based on decision data output from said decision means (84) for every field; and
   a recognition means (86) operatively connected to said correction means (85) for determining whether or not the corrected signals are readable.

2. A magnetic ink character recognition system as claimed in claim 1, wherein said decision means (84) judges the thickness of all characters contained in one field for every field, and derives a representative thickness value from a mean value of all thickness data in one field for every field.

3. A magnetic ink character recognition system as claimed in claim 1, wherein said digital signals output from said read means have negative peaks, and wherein said correction means (85) derives the corrected read signals in such a way that when a shifted value of a negative peak position exceeds one half of a standard thickness of a character, the shifted value is corrected to the standard thickness.

* * * * *